United States Patent [19]
Christman et al.

[11] Patent Number: 6,143,073
[45] Date of Patent: Nov. 7, 2000

[54] METHODS AND APPARATUS FOR MINIMIZING WHITE POINT DEFECTS IN QUARTZ GLASS CRUCIBLES

[75] Inventors: Marc A. Christman; Robert O. Mosier, both of Vancouver, Wash.

[73] Assignee: Heraeus Shin-Etsu America, Camus, Wash.

[21] Appl. No.: 09/195,886

[22] Filed: Nov. 19, 1998

[51] Int. Cl.⁷ .................................................. C30B 15/10
[52] U.S. Cl. ........................... 117/208; 117/900; 65/17.3; 65/17.4; 65/71; 65/144; 65/302
[58] Field of Search .................................. 65/17.3, 17.4, 65/71, 144, 302; 117/208, 900; 428/34.6

[56] References Cited

U.S. PATENT DOCUMENTS

| | | | |
|---|---|---|---|
| 3,777,042 | 12/1973 | Bowman | 373/88 |
| 4,330,362 | 5/1982 | Zulehner | 117/33 |
| 4,416,680 | 11/1983 | Brüning et al. | 65/144 |
| 4,438,515 | 3/1984 | Dunkelmann et al. | 373/88 |
| 4,935,046 | 6/1990 | Uchikawa et al. | 65/17.4 |
| 4,956,208 | 9/1990 | Uchikawa et al. | 428/34.6 |
| 5,010,034 | 4/1991 | Manoliu | 437/89 |
| 5,269,875 | 12/1993 | Sonokawa et al. | 117/15 |
| 5,476,065 | 12/1995 | Ikezawa et al. | 117/217 |
| 5,573,591 | 11/1996 | Ikezawa et al. | 117/20 |
| 5,917,103 | 6/1999 | Watanabe et al. | 65/17.3 |

FOREIGN PATENT DOCUMENTS

| | | | |
|---|---|---|---|
| 0 746 032 | 12/1996 | European Pat. Off. | H01L 27/06 |
| 0 813 232 | 12/1997 | European Pat. Off. | H01L 21/20 |
| 402188489 | 7/1990 | Japan . | |
| 406279167A | 10/1994 | Japan . | |

OTHER PUBLICATIONS

French Search Report from French Patent Application 98 01313, filed Jan. 30, 1998.
Patent Abstracts of Japan, vol. 007, No. 243 (E–207), Oct. 28, 1983 & JP-A-58 131748 (Fujitsu KK).
Patent Abstracts of Japan, vol. 095, No. 010, Nov. 30, 1995 & JP-A-07 176742 (NEC Corp.).
Patent Abstracts of Japan, vol. 013, No. 541 (E–854), Dec. 5, 1989 & JP-A-01 223765 (NEC Corp.).

*Primary Examiner*—Benjamin L. Utech
*Assistant Examiner*—Donald L. Champagne
*Attorney, Agent, or Firm*—Parsons Behle & Latimer; Kenneth E. Horton

[57] ABSTRACT

Methods and apparatus for manufacturing silica crucibles 9 containing few, if any, white point defects. The white point defects are reduced by decreasing the amount of silica vapor condensing on electrodes 4,5,6 used in the manufacturing process. The silica vapor condensation is decreased by providing a flow of a protective or non-reactive gas or gas mixture through protective devices 11,12,13, over portions of the electrodes where the silica vapor would otherwise condense.

19 Claims, 3 Drawing Sheets

150
METHODS AND APPARATUS FOR MINIMIZING WHITE POINT DEFECTS IN QUARTZ GLASS CRUCIBLES

BACKGROUND OF THE INVENTION

The present invention generally relates to crucible fabrication. Specifically, the present invention relates to methods and apparatus for making quartz glass crucibles that are suitable for use in pulling silicon single crystals for semiconductor applications.

There are several methods for making single crystal silicon materials. One such method—the "Czochralski" (CZ) method—has been widely adopted for producing single crystal silicon materials for semiconductor applications. In this method, polycrystalline silicon is melted in a vessel and a single-crystal seed crystal is dipped at its tip end portion into the molten silicon. The seed crystal is then "pulled" while being rotated so that a single crystal from the melt is grown on the seed crystal with the same crystallographic orientation.

A crucible is one vessel commonly employed in this pulling operation for making ingots of silicon single crystals. Crucibles are typically configured in a bowl shape, with walls and a bottom, to contain the molten silicon during the pulling operation. Crucibles may be made of any material which adequately contains the molten silicon without contaminating it, yet introduces a desired amount of oxygen into the molten silicon. One of the most widely used materials for such crucibles is silica or quartz glass.

Quartz glass crucibles can be manufactured by many processes. One such process—the "normal fusion" process—includes introducing a finely ground mass of crystalline or amorphous silica particles into a hollow mold which rotates about a vertical axis. Quartz particles are widely used as crystalline silica particles because of their high purity and economical availability. As the mold rotates, a layer of quartz particles forms on the wall and bottom of the mold by the force of rotation. A blade is used to scrape the particles to obtain a desired shape and, when needed, remove excess particles. Heat is applied to melt and fuse the silica or quartz particles, thus forming the wall and bottom of the crucible. After cooling, the crucible is removed from the mold.

Normally, crucible walls are opaque because they contain numerous tiny bubbles. When the bubbles open during the crystal-pulling operation, it can damage the silicon ingots. To reduce the impact of bubbles in the crucible walls, an inner layer is often formed on the inside of the crucible. There are numerous methods known for preparing such inner layers which are substantially bubble-free, such as those methods disclosed in U.S. Pat. Nos. 4,416,680, 4,956,208, and 4,935,046, the disclosures of which are incorporated herein by reference. In one such method, quartz particles are formed into a crucible shape in a rotating mold by fusing the particles with an electric arc near the center of the rotating axis. As the particles fuse to make the crucible shape, additional particles are sprayed through the arc towards the fused crucible surface and deposits on the inner surface to make a substantially bubble-free layer. This method is known as a "hybrid fusion" process because melting the particles and deposition of the sprayed particles are performed simultaneously. These bubble-free inner layers, which produce crucibles of a very high purity, will probably be required for the next generation of crucibles employed to produce silicon ingots.

In such "hybrid fusion" processes, the silica or quartz particles are introduced through the arc created between opposing electrodes, often made of graphite. In passing through the arc, the particles are substantially—if not completely—melted. Heating the silica particles using the arc, however, causes a substantial quantity of silica vapor to form. The silica vapor condenses on any object whose surface temperature is lower than the silica vapor, such as the cooler portions of the electrodes, and becomes silica particles. When the graphite electrodes erode during the crucible-making process due to oxidation of the graphite, the silica particles condensed on the electrodes fall away in flakes. These silica flakes fall into the crucible while the walls are hot and form an opaque white defect—a "white point" defect—on the surface of the crucible wall. These white point defects can cause difficulties in pulling single crystal silicon from the quartz glass crucible. Accordingly, quartz glass crucibles containing these white point defects must be discarded.

SUMMARY OF THE INVENTION

The present invention provides methods and apparatus for manufacturing silica crucibles containing few, if any, white point defects. The white point defects are reduced during the inventive process by decreasing the amount of silica vapor condensing on electrodes used in the manufacturing process. The silica vapor condensation is decreased by providing a flow of a protective or non-reactive gas or gas mixture over areas of the graphite electrodes where the silica vapor might condense. The flow of protective gas or gas mixture is provided by nozzles, jets, or the like located proximate the desired areas of the electrodes.

The present invention includes a method for making at least one silica crucible which comprises providing a crucible substrate, providing a plurality of electrodes having an arc or plasma discharge therebetween, melting silica particles by introducing them through the arc or plasma discharge toward the crucible substrate, protecting the electrodes from silica vapor condensation, and cooling the crucible to its final form. The plurality of electrodes can be graphite electrodes and the arc discharge established by voltage across the electrodes. The electrodes are protected by flowing a non-reactive gas or mixture of non-reactive gases over a desired portion of the electrodes to reduce the amount of silicon oxide vapor condensing on the electrodes. The non-reactive gas may be neon, helium, argon, or nitrogen. The method reduces the amount of white point defects in a plurality of crucibles so that less than 7% of the crucibles contain is white point defects.

The present invention also includes an apparatus for making a silica crucible which comprises a crucible substrate, a plurality of electrodes having an arc or plasma discharge therebetween, means for introducing silica particles through the arc or plasma discharge and into the crucible substrate, and means for protecting at least a portion of the electrodes from silica vapor condensation. The electrodes can be graphite electrodes and the arc discharge established by voltage through the electrodes. The protecting means includes flowing means for establishing a flow of a non-reactive gas or mixture of non-reactive gases over the desired portion of the electrodes. The flowing means may be at least one nozzle proximate the desired portion of the electrode.

BRIEF DESCRIPTION OF THE DRAWINGS

FIGS. 1–3 presented in conjunction with this description are views of only particular portions—rather than complete portions—of a quartz glass crucible and an apparatus for making the same.

DETAILED DESCRIPTION OF THE INVENTION

The following description provides specific details, such as dimensions and materials, in order to provide a thorough understanding of the present invention. The skilled artisan, however, would understand that the present invention may be practiced without employing these specific details. Indeed, the present invention can be practiced in conjunction with fabrication techniques conventionally used in the industry. Moreover, the process steps and structures described below neither describe a complete apparatus nor a complete process flow for manufacturing quartz glass crucibles.

Figure 1:
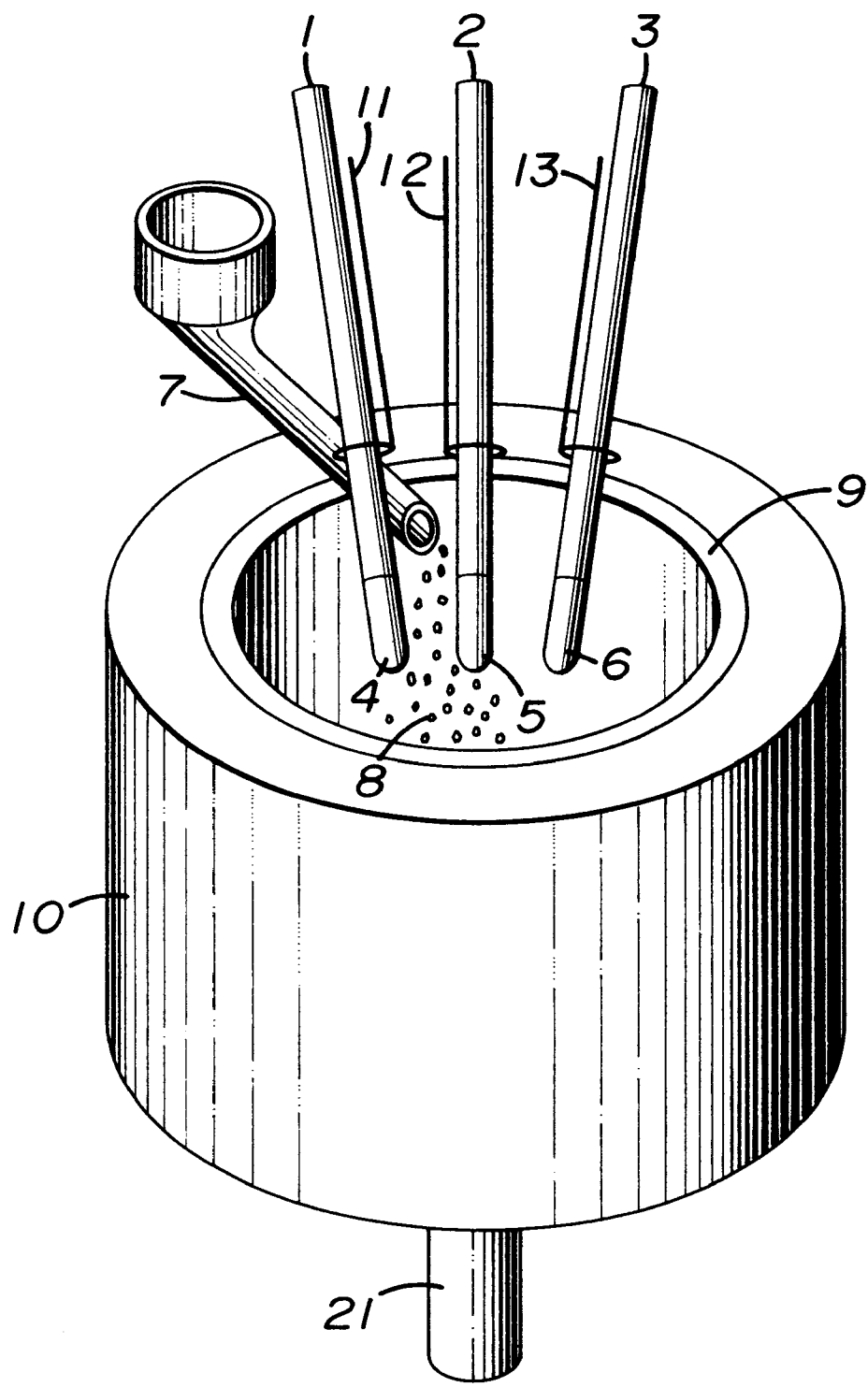
FIGS. 1–3 are views of one process and apparatus for making quartz glass crucibles according to the present invention.
Figure 2:
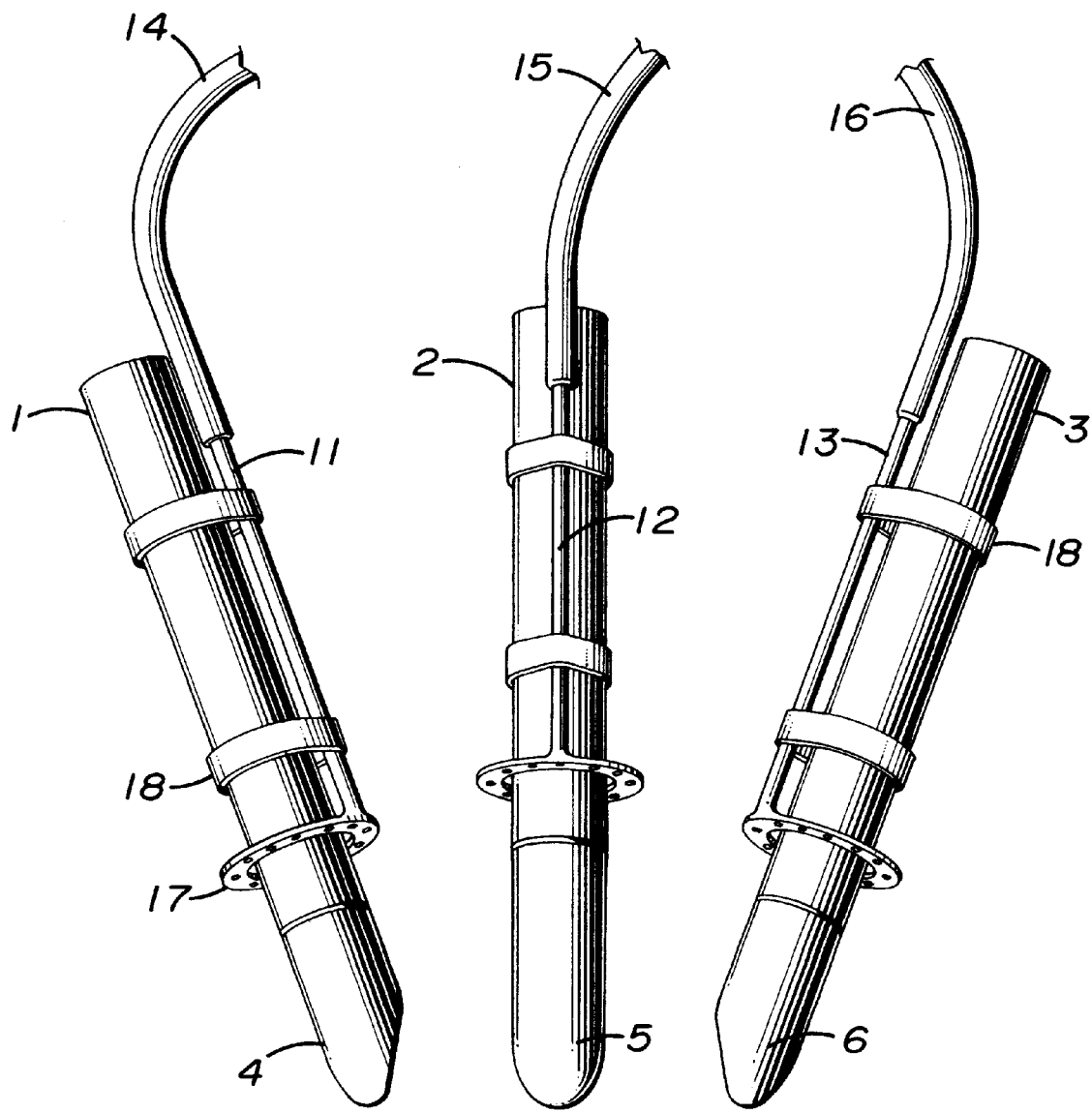
Figure 3:
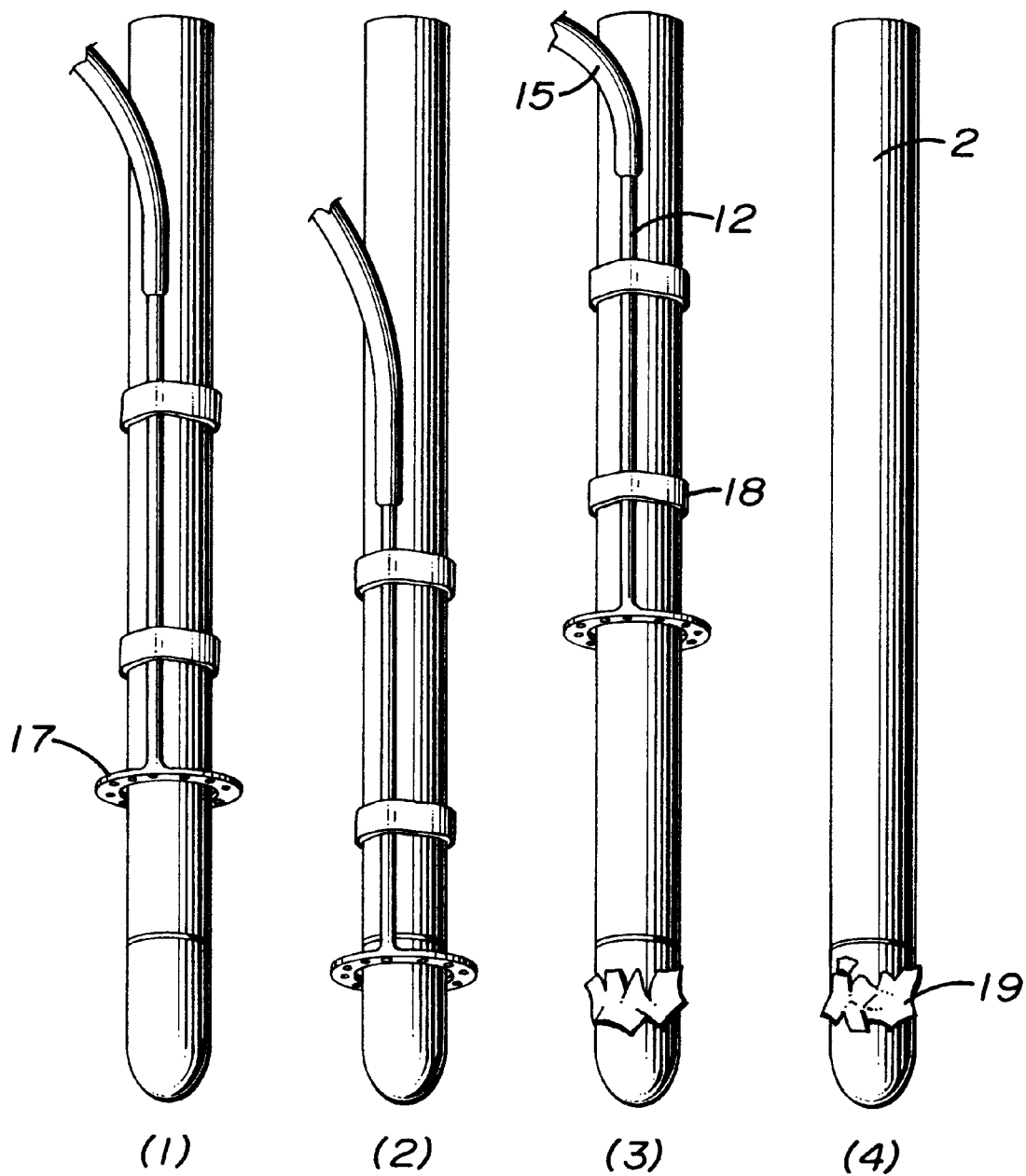

FIGS. 1–3 illustrate one method and apparatus for making a quartz glass crucible according to the present invention. It will be understood, however, by those skilled in the art that other apparatus and methods could be formed by modifying the illustrated method, such as by using electrodes other than graphite.

FIG. 1 illustrates an exemplary crucible making-process in which the present invention can be employed. In FIG. 1, rotatable mold 10 is provided with rotating shaft 21. Electrodes 4, 5, and 6 are disposed within mold 10 and are held by electrode holders 1, 2, and 3, respectively, which typically are metallic double-walled pipe cooled with water between the walls. Grain supply means 7 supplies quartz or silica particles (or powder or grain) 8 near the electrodes and into mold 10 to form a bubble-free layer on the inner surface of the quartz glass crucible 9. Protecting devices 11, 12, and 13 are attached to electrode holders 1, 2, and 3, respectively.

The configuration and the size of mold 10 depends on the desired configuration and size of crucible 9 to be produced. Mold 10 may be made of any suitable material having a satisfactory heat resistance and mechanical strength, yet which may be formed into any desired configuration, such as stainless steel or graphite.

Crucible 9 is formed on the inner surface of mold 10 by any suitable process. In one suitable process, mold 10 is rotated about rotating shaft 21. High-purity silicon dioxide grain 8 is then supplied near electrodes 4, 5, and 6, and directed toward the inner surface of mold 10. When an arc discharge is produced across the electrodes, some quartz grain—if not all—is melted by the arc. The grain is simultaneously deposited on the inner surface of mold 10 to form a substantially bubble-free quartz glass layer of a predetermined thickness depending on the total fusion time.

Electrodes 4, 5, and 6 are connected with an external power source so the electrodes are subjected to a high voltage to produce the arc discharge. Alternatively, a high-frequency plasma discharge can be employed instead of an arc discharge. While FIG. 1 illustrates three electrodes, the present invention can employ any number of electrodes greater than 1. Moreover, the configuration of the electrodes can be modified in any desired manner.

Electrodes 4, 5, and 6 are made of any suitable material, such as carbon or graphite. The electrodes are connected to water-cooled metallic electrode holders as shown in FIG. 1, with a diameter 85% to 150% of that of the electrode, at the end thereof to cool the electrodes with water. Thus, there is a temperature gradient along the electrode from the water-cooled end to the end where the arc is maintained. The arc discharge may be of a bulged configuration so that when grain 8 passes through, it is distributed throughout a wide range of the inner surface of mold 10.

Quartz grain 8 used in the process of the present invention may be of any suitable size which will melt and form a crucible under the operating conditions. Grain 8 may be crystalline, amorphous, or a mixture thereof and preferably is of a high purity so impurities in the crucible can be minimized.

When heating grain 8 with the arc discharge, silica vapor or fume is released and condenses on the electrodes, especially on the cooler portions of the electrodes, including the areas near the water-cooled end of the electrode. Accordingly, silica vapor deposition is heaviest at the cooler portions of the electrodes. As discussed above, this causes "white point" defects in the crucible since the condensed silica can "flake off" the electrodes during the manufacturing process. The present invention includes means for reducing the condensation of silicon dioxide vapor on the graphite electrodes, thus reducing these white point defects.

In one embodiment, the means for reducing this silica vapor condensation on the electrodes includes an apparatus which blows a protecting or non-reactive gas or gas mixture over a portion of the electrodes. Any suitable flow of protecting gas across the surface of the graphite electrode can be employed in the present invention, provided it lifts the silica vapor away from the electrode and/or reduces the amount of silica vapor condensing on the electrodes.

Silica fume deposition may not be uniform about the circumference of the electrode. The side of the electrode facing away from the other electrode(s)—being the most cool—is where the most silica deposits. Thus, the flow of the protecting gas can be concentrated there.

By keeping the silica vapor away from the graphite electrode, the vapor is prevented from condensing on the graphite electrode. Instead, the silica vapor is exhausted and/or condenses on a more stable surface which holds the condensed silica vapor until the crucible is formed. Accordingly, the silica vapor does not "flake off" the electrodes and create white point defects in the crucible.

Any suitable gas (or mixture of gases) which protects the electrodes from the silica vapor and/or does not react with the quartz glass crucible, silica powder, and the electrodes can be employed in the present invention. Suitable gases include, but are not limited to, neon (Ne), helium (He), argon (Ar), nitrogen ($N_2$), and mixtures thereof. Preferably, substantially pure nitrogen is employed as the non-reactive gas in the present invention. Nitrogen is the preferable gas because of its reasonable cost and minimal interference with the arc characteristics.

Any apparatus suitable for blowing the non-reactive gas across the surface of the electrodes can be employed in the present invention. One such apparatus is illustrated in FIG. 2, where the non-reactive gas is blown past electrodes 4, 5, and 6 by protecting devices 11, 12, and 13. Protecting devices 11, 12, and 13 generally comprise blowing means for providing a flow of the non-reactive gas, supplying means for supplying the non-reactive gas to the blowing means, and controlling means for regulating the flow of the protective gas.

Protecting devices 11, 12, and 13 should be located near the respective electrode so a proper flow of non-reactive gas is established. In the embodiment illustrated in FIG. 2, protecting devices 11, 12, and 13 may be fixed to the electrode holder by fixture means 18.

The blowing means of protecting devices 11, 12, and 13 may be at least one conventional nozzle, including a ring of pipe or hollow double-wall casing with a sealed end which is equipped with an array of downward-facing holes 17 spaced around the electrode holder to direct a stream of gas along the electrode surface. To keep the protecting gas flowing along the electrode surface, the nozzle(s) preferably should be a line source or array of discrete sources. The nozzle(s) should be attached to the electrode holders, rather than the electrodes, to prevent overheating of the nozzle(s).

The nozzles have a configuration (e.g., ring) and outside circumference consistent with the configuration and circumference of the electrode encompassed. Preferably, the diameter of the nozzle/hole array may range from about 110% to about 200% of the outer diameter of the electrode holder, and is preferably about 130% of the outer diameter of the electrode holder. The number and size of holes, as well as the spacing, will depend on the desired flow characteristics. For example, given a cathode diameter of 35 mm and an anode diameter of 60 mm, the anode rings have 20 holes with a 1/32" diameter and the cathode rings have 18 holes with a 1/16" diameter. Preferably, the distance between any hole (or nozzle) is less than twice the distance between the hole and the electrode surface.

The length and array of the nozzles can be adjusted to deliver the gas flow to the area of highest fume build up. For example, given the configuration of the electrodes in FIG. 2, the holes on the center electrode nozzle ring should be arranged uniformly around the circumference of the electrode since the silica fume is deposited uniformly. On the side electrodes, however, the fume deposition is not uniform. The heaviest fume deposits on the outer side of the electrode opposite the center electrode. Therefore, the blow holes are more dense in this area.

Alternative blowing means include other types of nozzles, jets, and the like which could establish the desired flow of protecting gas. Blowing means can have other shapes and configurations (e.g., rectangular) depending on the shape and configuration of the electrodes.

The supplying means should be properly connected to the blowing means to insure sufficient flow of protective gas. In one embodiment illustrated in FIG. 2, supply tubes 14, 15, and 16 can be mounted in any desired configuration to protecting devices 11, 12, and 13, respectively. The supplying means is also connected to storage means (not shown), such as a reservoir, containing the non-reactive gas.

The supplying means and blowing means can be made of the same or different material. Suitable materials include those materials which do not introduce impurities or degrade the crucible making process, such as high-purity quartz glass, sapphire, diamond, or zirconia. Preferably, the blowing and supplying means are constructed of high-purity silica or quartz glass.

Controlling means (not shown) are located between the storage means and the blowing means to control the flow rate of the non-reactive gas. Controlling means are required to properly control the flow rate of the non-reactive gas. Generally, the total gas flow though the nozzle array can range from about 80 cm$^3$/sec, which can be employed while fusing the crucible substrate, to about 10,000 cm$^3$/sec, which can be employed when introducing silica particles through the arc. Less than about 80 cm$^3$/sec, and more specifically less than 0.4 cfm (cubic feet per minute) when nitrogen is the non-reactive gas, can be ineffective in reducing build up of the silica vapor and ineffective in protecting the nozzle from heat damage. A flow rate greater than 10,000 cm$^3$/sec, and more specifically more than 2.6 cfm at 60 psi when nitrogen is the non-reactive gas, can interfere with the arc produced between the electrodes. The non-reactive gas can interfere with the arc by essentially blowing away the ionized gases which provide the conductive path for the arc, thus requiring additional voltage to re-ionize the path between the electrode to maintain the arc. The nitrogen gas flow should also be controlled within the desired flow rate in order to minimize disruption of the arc. Disrupting the arc can cause premature erosion of the electrode, stoppage or sputtering of the arc, changes in the crucible dimension, and bubble formation on the inner surface of the crucible.

The flow rate of the non-reactive gas should also be controlled to proportionately respond to the condensation rate of the silica vapor. As the amount of the silica vapor increases or decreases, there should be a corresponding increase or decrease in the flow rate of the non-reactive gas past the electrodes to lift the silica vapor away from the electrodes.

The flow rate of the non-reactive gas near the electrodes can be optionally pulsed. Pulsation reduces the total arc disruption over time while maintaining the desired non-reactive gas flow to suppress the condensation of silica on the electrodes. The gas flow rate and pulsing of the gas is maintained either manually via a pressure regulator, needle valves, and flow gauges or automatically via a mass flow controller, programmable logic controller, and a series of pneumatic solenoids.

Protecting devices 11, 12, and 13 can be located at any desired position of the electrode holder and/or the electrode. Generally, protecting devices 11, 12, and 13 are located where they can reduce—and preferably prevent—silica vapor deposits. Preferably, the protecting devices are located proximate to the areas of the electrodes where the silica vapor deposits the most, such as the cooler parts of the electrodes.

Illustrations (1), (2), and (3) of FIG. 3 depict some of the various locations of protecting device 12 attached to the center electrode holder 2 in the present invention. Illustration (4) of FIG. 3 represents an electrode with no protective device attached to reduce the amount of silica vapor deposits. Without a protecting device, fume or silica vapor deposits 19 on the upper part of the electrode, forms a film, and then flakes off.

Illustration (1) of FIG. 3—where protecting device 12 is located on the electrode holder so holes 17 are near the electrode—depicts one preferred location of the device since this minimizes silica vapor deposits on the electrode. In illustration (1), gas blown from holes 17 sweeps down the electrode holder surface and then along the electrode surface. The distance between the nozzle array and the end of the electrode holder should be optimized, and is preferably up to about three times the diameter of the electrode holder.

As depicted in FIG. 3, illustration (2)—where protecting device 12 is located next to the electrode rather than the electrode holder—depicts a less preferred location of the device. This configuration minimizes silica vapor deposits 19 on the electrode, but the nozzle can be quickly damaged by the plasma heat. Accordingly, the nozzle array should not be located too near the electrodes, at least when using materials that are easily damaged by the plasma heat.

Illustration (3) of FIG. 3—where protecting device 12 is located on the electrode holder, but the nozzle position relative to the end of the electrode holder exceeded about 5 times the electrode diameter—depicts a less preferred location. The nozzle is too far away from the area of fume deposit for the protective gas amount and velocity to be adjusted to prevent fume deposits.

Using the protecting gas or gas mixture according to the present invention greatly decreases the white point defects in crucibles. Generally, a batch of crucibles can be manufactured with losses less than the normal loss rate for white point defects, which typically run about 7%. Specifically, a batch of 63 crucibles were manufactured with no to about less than 2% losses due to white point defects.

Having thus described in detail the preferred embodiments of the present invention, it is to be understood that the invention defined by the appended claims is not to be limited by particular details set forth in the above description, as many apparent variations thereof are possible without departing from the spirit or scope thereof.

We claim:

1. A method for making at least one silica crucible, comprising:
   providing a crucible substrate;
   providing a plurality of electrodes having an arc or plasma discharge therebetween;
   melting silica particles by introducing them through the arc or plasma discharge toward the crucible substrate;
   protecting a portion of the electrodes proximate the crucible substrate from silica vapor condensation; and
   cooling the crucible to its final form.

2. The method of claim 1, including reducing the amount of white point defects in the at least one crucible.

3. The method of claim 2, the method making a plurality of crucibles with white point defects present in less than 7% of the crucibles.

4. The method of claim 3, including protecting a portion of the electrodes by flowing a non-reactive gas or mixture of non-reactive gases over a portion of each electrode.

5. The method of claim 4, wherein flowing the non-reactive gas or mixture of non-reactive gases reduces the amount of silica vapor condensing on the electrodes.

6. The method of claim 5, wherein the non-reactive gas is neon, helium, argon, or nitrogen.

7. The method of claim 6, wherein the non-reactive gas is nitrogen.

8. An apparatus for making a silica crucible, comprising:
   a mold for supporting a crucible;
   a plurality of electrodes having an arc or plasma discharge therebetween;
   means for introducing silica particles through the arc or plasma discharge and into the crucible substrate; and
   means for protecting the electrodes proximate the crucible substrate from silica vapor condensation.

9. The apparatus of claim 8, wherein the protecting means includes means for blowing a non-reactive gas or a mixture of non-reactive gases over a portion of the electrodes.

10. The apparatus of claim 9, further comprising means for regulating the flow of the non-reactive gas or mixture of non-reactive gases.

11. The apparatus of claim 10, wherein the blowing means is at least one nozzle proximate to a portion of the electrodes.

12. The apparatus of claim 11, wherein the at least one nozzle is proximate to a cooler portion of the electrodes.

13. The apparatus of claim 11, wherein the at least one nozzle is proximate to a portion of each electrode.

14. The apparatus of claim 13, wherein the at least one nozzle is a quartz glass pipe with at least one hole disposed therein.

15. The method of claim 3, the method making a plurality of crucibles with white point defects in less than 2% of the crucibles.

16. The method of claim 4, the flow of non-reactive gas or mixture of non-reactive gases supplied through an array of holes with a diameter ranging from about $1/32$ to about $1/16$ of an inch and with a flow rate ranging from about 0.4 cfm to about 2.6 cfm.

17. The method of claim 7, the nitrogen having a pulsed flow or a pulse-imposed flow.

18. The apparatus of claim 13, wherein the at least one nozzle is a hollow, double-walled casing with at least one hole disposed therein.

19. The apparatus of claim 14, wherein:
   the at least one nozzle is a quartz glass pipe ring located around the electrode holder with an array of holes having a diameter from about $1/32$ to about $1/16$ of an inch;
   the diameter of said array is about 130% of the diameter of the electrode holder; and
   the distance between the array and the end of the electrode holder is less than about three times the diameter of the electrode holder.

* * * * *